Figure 1:
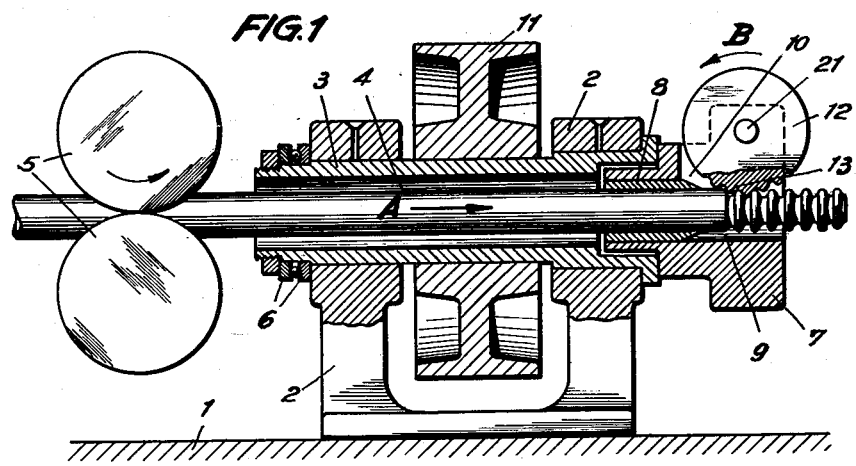

Oct. 21, 1952     O. KLEIN     2,614,607
APPARATUS FOR CORRUGATING TUBES
Filed Aug. 31, 1949     2 SHEETS—SHEET 1

INVENTOR
OTTO KLEIN
BY:
Michael S. Striker
agt.

Oct. 21, 1952  O. KLEIN  2,614,607
APPARATUS FOR CORRUGATING TUBES
Filed Aug. 31, 1949  2 SHEETS—SHEET 2
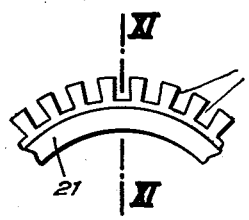
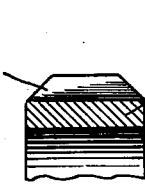
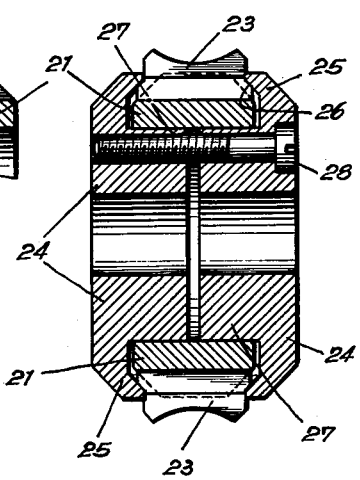
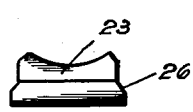
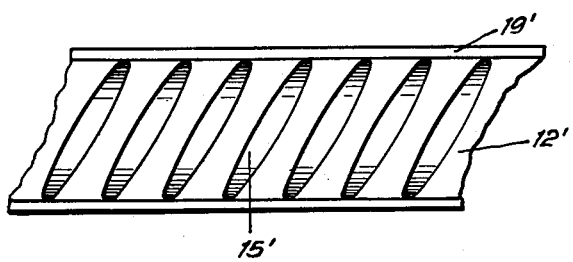
INVENTOR
OTTO KLEIN
BY:
Michael S. Striker
Agt.

Patented Oct. 21, 1952

2,614,607

UNITED STATES PATENT OFFICE 2,614,607

APPARATUS FOR CORRUGATING TUBES

Otto Klein, Pforzheim, Baden, Germany

Application August 31, 1949, Serial No. 113,291
In Germany October 1, 1948

12 Claims. (Cl. 153—73)

This invention relates to certain improvements in the manufacture of corrugated tubes. Such corrugated tubes are used for many purposes, more particularly also for pipe lines of all types and as a casing for electric cables etc. My novel system offers special advantages over the known methods and devices, especially where parallel corrugations are to be produced, but it can also be used for manufacturing helical corrugations. In some instances, tubes or pipes with parallel corrugations are more suitable than tubes with helical corrugations. Thus, e. g., the ends of parallelly corrugated tubes are more fit for setting and packing where the tubes are to be led in and fixed in junction boxes.

It has been suggested already to impress parallel corrugations into the wall of tubes by means of a pressure roller which rotates about an axis parallelly to the longitudinal axis of the tube, advancing towards the wall of the tube in a purely radial direction. Since the purely radial advancing of the rollers obviously is not satisfactory, it has been proposed additionally to exert an axial pressure upon the tube from the tube part already corrugated, by means of a special holder or claw engaging in the respective last finished corrugation, in an axial direction towards the penetrating pressure roller. Moreover, a mandrel has been advanced into the interior of the tube, from the tube end not yet corrugated, which mandrel has the shape of the inner corrugations of the tube at its end disposed in the tube. The pressure roller, whose profile has the shape of the outer corrugations of the tube, presses the tube wall against this end of the mandrel for forming each time a corrugation.

This known process has the disadvantage that it proceeds only in intermittent steps, i. e., after the formation of each corrugation the real shaping work has to be stopped, the said tube holder must be removed, advanced by one corrugation and applied again. Also the mandrel fixing means have to be released, the mandrel must be advanced and fixed again. Where it is necessary, in order to make corrugated tubes of a great length, to start from a tube of a corresponding length, a method operating with the aid of a mandrel cannot be used since the latter would have to be fed to the working point through too long a way in a straight line.

It is the object of the present invention to provide means by which said disadvantages can be avoided.

With this object in view, the device according to the present invention comprises a head which is mounted for rotation and provided with a bore whose axis coincides with the axis of rotation of the head, pressure rollers which are mounted in said head for rotation about axes disposed in a plane at right angles to the axis of rotation of the head, and teeth disposed at the circumference of the pressure rollers and projecting into the region of the bore of the head intended for feeding the tube to be corrugated.

More particularly, the head provided with radial slots for the reception of the pressure rollers can be carried at one end of a spindle perforated axially for feeding the tube to be corrugated and rotating in a spindle head stock, while feed rollers are arranged before the opposite end of the spindle for gripping the smooth tube and feeding it to the pressure rollers which moreover are caused to rotate by said feeding motion as will be hereinafter described in detail.

Other and further objects, features and advantages of the invention will be pointed out hereinafter and appear in the appended claims forming part of the application.

In the accompanying drawings several now preferred embodiments of the invention are shown by way of illustration and not by way of limitation.

In the drawings—

Figure 2:
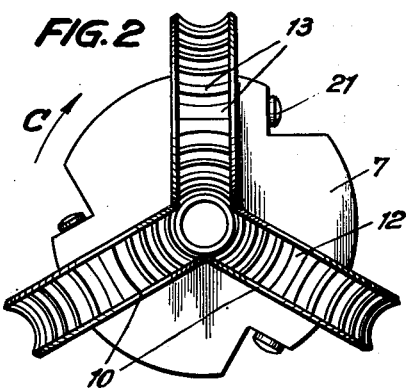
Figure 5:
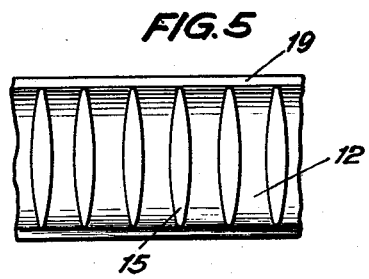
Figure 3:
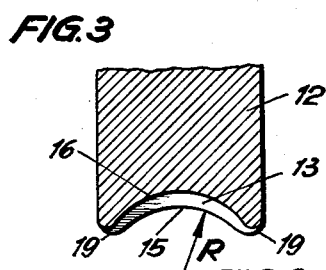
Figure 4:
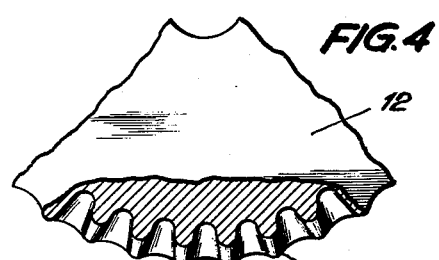
Figures 7, 8:
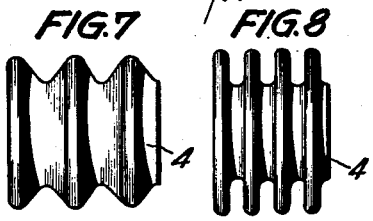
Figure 6:
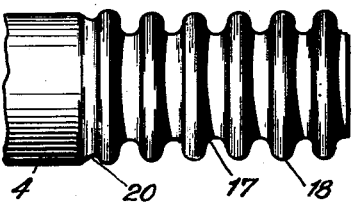

Fig. 1 is an axial section of the head stock including the spindle, the head member with the pressure rollers, and feed rollers, Fig. 2 is a front view of the head member with the pressure rollers, on a larger scale, Figs. 3, 4 and 5 show an axial section, a side elevation, partly in section, and a plan view, respectively, of a part of the pressure roller, drawn on a still larger scale, Fig. 6 is an elevation of a tube corrugated by means of my novel device, Figs. 7 and 8 are elevational views showing the two manufacturing stages of corrugated tubes having a high flexibility, Fig. 9 is an axial section of a pressure roller with inserted teeth of hard metal, Fig. 10 is an elevational view showing a part of a ring bearing the teeth, Fig. 11 is a section on line XI—XI in Fig. 10, Figs. 12 and 13 are side and plan views, respectively, of a single tooth of hard metal, and Fig. 14 is a view similar to Fig. 5 of a different type of pressure roller.

Similar reference numerals denote similar parts in the different views.

Referring now to the drawings in greater detail, and first to Figs. 1 and 2, it will be seen that the head stock 2 including a hollow spindle 3 mounted for rotation therein is fastened on a base 1 which may be, e. g., a bed of a lathe. The tube 4 which is to be corrugated is introduced through the spindle 3 and in operation is continuously advanced by the rollers 5 in the direction A. At its end facing the feed rollers 5 the spindle 3 is provided with a thrust or step bearing 6 by which it is supported against the axial thrust at the head stock 2 acting in the direction A. Screwed to the opposite end of the spindle 3 is a roll head 7 which has an axial bore 9 advantageously lined by a sleeve 8, and e. g. three, radial slots 10 staggered by 120°. The sleeve 8 forms an accurately fitting guide for the tube 4 passed through it and through the bore 9 and moving in operation in a longitudinal direction only, but not rotating. The spindle 3 together with the head 7 on the contrary is imparted a rotary drive (C, Fig. 2) by a belt pulley 11 or by any other means. The slots 10 are traversed by shafts or pins 21 on which the pressure rollers 12 are rotatably mounted. These pressure rollers, e. g. three in number, have teeth 13 provided at their circumference and projecting into the compass of the head bore 9 and so also into the compass of the tube 4 upon which they act during its advance simultaneously in an axial and in a radial direction, thereby producing the corrugations. Thus, the pressure rollers 12 are rotated (B, Fig. 1) solely by the advance (A, Fig. 1) of the tube, while the drive for revolving them about the central axis of the tube (direction C in Fig. 2) is produced by the rotation of the spindle 3.

The operation is as follows:

After the tube 4 has been introduced through the hollow spindle 3 up to the pressure rollers 12, the spindle 3 is rotated and the pressure rollers 12 are thereby caused to revolve in the direction C. Now the continuous feed motion of the tube 4 by means of feed rollers 5 is started, so that the tube 4 comes into touch with the teeth 13 of the rollers 12 and the latter are caused to rotate also in the direction B. In this initial stage the rounded edge 14 of the top of the tooth (Figs. 3 and 4) will contact the outer surface of the wall only by its middle portion 15 although it is inwardly arched, i. e. of a concave stage. However, the diameter R is made so large that just only the said punctiform contact of the part 15 of the tooth head with tube 4 will take place. As the tooth 13 thus engaging the wall of the tube revolves in the direction C (Fig. 2), therefore, at first only a slight although uniform groove 20 (Fig. 6) will be formed. Since the pressure rollers 12 continue to rotate under action of the feeding motion of the tube in the direction B (Fig. 1), the edge 14 will gradually advance towards the tube wall also with its parts at both sides of point 15; the groove is thus growing deeper, the tube material required for the formation of the groove being automatically taken from the material fed by the axial advance of the tube, without any pulling. Finally the tooth 13 will have penetrated entirely up to its root line 16 (Figs. 3 and 4) which is also rounded off. In this instance the edge 14 will finish the inner rounding 17 and the edge 16 will finish the outer rounding 18 of the corrugation (Fig. 6). Since the edge 14 in this case rolls throughout its length under constant pressure on the inner rounding 17 of the corrugation, in the direction C, the end portions 19 of the edge 14 are rounded off towards the outer side and thus will save the tube against grinding and tearing in. This purpose and a clean smoothing of the walls of the grooves can be attained moreover by a convex configuration of the flanks of the teeth (Fig. 5). By this convex configuration of their flanks the teeth 13 will obtain a taper at both sides from their midpoint 15 towards the ends 19.

The said process of the formation of waves or corrugations will repeat itself with every tooth 13 which on completion of its work will gradually leave the corrugation or wave formed by it in the manner known from toothings.

Depending on the shape of the teeth, shallow or deep corrugations can be rolled into the wall of the tube with the aid of my novel machine. In this case the pitch or distance between adjacent corrugations cannot be decreased beyond a certain limit, since every tooth, as described above, has to leave its corrugation again as the pressure roller moves on. However, if it is desired to make the spacing of the waves smaller and the depth larger than attainable by the rolling process, in order to attain a particularly large flexibility for special purposes, this may be effected in a simple manner by axial upsetting of the corrugated tube shown in Fig. 7 into the shape shown in Fig. 8.

In the head 7 there may be provided adjusting means as known per se which act upon the roller axes 21 in such a way that the pressure rollers 12 can be adjusted in a radial direction, i. e. towards the tube 4 or away therefrom, so as to adjust the wave depth.

Where it is intended to roll helical corrugations into the tube with the aid of my novel device, pressure rollers 12' are provided with teeth forming an angle with the longitudinal axis of the tube in accordance with the desired pitch of the helical corrugation, as shown in Fig. 14 where the central parts 15' of the teeth extend out to the sides 19'.

In order to produce corrugations on tubes consisting of a material which is difficult to work, or for attaining high rolling speeds it has been found advantageous according to a further feature of the invention, to make the teeth of another and harder material than the body of the pressure roller. An exemplification of such a composite pressure roller is shown in Figs. 9 to 13. The roller comprises a ring 21 having peripheral grooves 22 into which the individual teeth 23 made of special hard metal are inserted. In order to fasten the teeth 23 in the ring 21, covers 24 are attached on both sides of the ring 21, said covers having claw-shaped edges 25 overlying the bevelled surfaces 26 of the enlarged shoulders of the teeth (Fig. 9) while the collars 27 project into the interior parts of the ring 21. In this position the covers 24 are interconnected by screws 28, thus clamping down the teeth 23 immovably between the covers and on the ring 21.

While the invention has been described in detail with respect to certain now preferred examples and embodiments of the invention it will be understood by those skilled in the art after understanding the invention, that various changes and modifications may be made without departing from the spirit and scope of the invention and it is intended, therefore, to cover all such changes and modifications in the appended claims.

Having thus described my invention, I claim as new and desire to secure by Letters Patent:

1. In an apparatus for the corrugation of tubes, in combination, a main frame, a head member mounted for rotation in said main frame and having a bore whose axis coincides with the axis of rotation of said head member, a plurality of pressure rollers mounted in said head member for rotation about axes lying in a plane at right angles to the axis of rotation of said head, and teeth provided at the circumference of said pressure rollers and projecting into the compass of said bore of the head member through which the tube to be corrugated is passed.

2. In an apparatus for the corrugating of tubes, in combination, a main frame, a head stock mounted in said main frame, a centrally bored spindle adapted for passing through said central bore the tube to be corrugated, said spindle being mounted for rotation in said head stock, a head member mounted at the front end of said spindle, pressure rollers mounted for rotation in radial slots of said head member and comprising teeth provided at their circumference and projecting into a central bore of said head member, and feed rollers disposed before the rear end of said spindle and adapted for engaging and axially feeding said tube, whereby said pressure rollers are also caused to rotate.

3. In an apparatus for the corrugating of tubes, in combination, a main frame, a head stock mounted in said main frame, a centrally bored spindle adapted for passing through said central bore the tube to be corrugated, said spindle being mounted for rotation in said head stock, a head member mounted at the front end of said spindle, pressure rollers mounted for rotation in radial slots of said head member and comprising teeth provided at their circumference and projecting into a central bore of said head member, feed rollers disposed before the rear end of said spindle and adapted for engaging and axially feeding said tube, whereby said pressure rollers are also caused to rotate, and a thrust bearing disposed between said spindle and said head stock for supporting said spindle against the axial thrust caused by the feeding motion of said tube.

4. In an apparatus for the corrugation of tubes, in combination, a main frame, a head member mounted for rotation in said main frame and having a bore whose axis coincides with the axis of rotation of said head member, a plurality of pressure rollers mounted in said head member for rotation about axes lying in a plane at right angles to the axis of rotation of said head, and teeth provided at the circumference of said pressure rollers and projecting into the compass of said bore of the head member through which the tube to be corrugated is passed, said teeth being rounded off at their tip edges and being inwardly arched in a concave shape, the diameter of said inward arching being made so large that the tip edge of the tooth during the rotation of the roller at first contacts the wall of the tube with its middle part only from which the contact extends towards both sides as the rotation of the pressure rollers proceeds.

5. An apparatus as claimed in claim 4, in which the ends of the tip edge of the tooth are rounded off outwardly.

6. An apparatus as claimed in claim 4, in which the flanks of the pressure roller teeth are convex-shaped, the teeth thus being tapered from their middle part towards both ends.

7. In an apparatus for the corrugating of tubes, in combination, a main frame, a head stock mounted in said main frame, a centrally bored spindle adapted for passing through said central bore the tube to be corrugated, said spindle being mounted for rotation in said head stock, a head member mounted at the front end of said spindle, pressure rollers mounted for rotation and radial adjustment in radial slots of said head member and comprising teeth provided at their circumference and projecting into a central bore of said head member, and feed rollers disposed before the rear end of said spindle and adapted for engaging and axially feeding said tube, whereby said pressure rollers are also caused to rotate.

8. In an apparatus for producing helical corrugations in tubes, in combination, a main frame, a head member mounted for rotation in said main frame and having a bore whose axis coincides with the axis of rotation of said head member, a plurality of pressure rollers mounted in said head member for rotation about axes lying in a plane at right angles to the axis of rotation of said head, and teeth provided at the circumference of said pressure rollers and projecting into the compass of said bore of the head member through which the tube to be corrugated is passed, said teeth forming with the longitudinal axis of the tube an angle corresponding to the pitch of said helical corrugations, and means for rotating said head member.

9. In an apparatus for the corrugation of tubes, in combination, a main frame, a head member mounted for rotation in said main frame and having a bore whose axis coincides with the axis of rotation of said head member, a plurality of pressure rollers mounted in said head member for rotation about axes lying in a plane at right angles to the axis of rotation of said head, and teeth inserted each separately in the circumference of said pressure rollers and projecting into the compass of said bore of the head member through which the tube to be corrugated is passed, means for rotating said head member, and means for feeding the tube to be corrugated to said pressure rollers.

10. In an apparatus for the corrugation of tubes, in combination, a main frame, a head member mounted for rotation in said main frame and having a bore whose axis coincides with the axis of rotation of said head member, a plurality of pressure rollers mounted in said head member for rotation about axes lying in a plane at right angles to the axis of rotation of said head, teeth inserted separately in grooves provided at the circumference of the rim of each pressure roller and projecting into the compass of said bore of the head member through which the tube to be corrugated is passed, and a pair of cover members screwed to said rim and retaining said teeth in said grooves.

11. An apparatus as claimed in claim 10, in which each of said cover members has a claw-shaped inwardly projecting rim while said teeth are formed each with an enlarged bevelled root portion, said inwardly projecting rims overlying said bevelled root portions.

12. An apparatus as claimed in claim 10, in which each of said cover members is formed with an axial collar portion projecting into an annular groove in said pressure roller rim, said covers being held together by mutual screwing up.

OTTO KLEIN.

REFERENCES CITED

The following references are of record in the file of this patent:

UNITED STATES PATENTS

| Number | Name | Date |
|---|---|---|
| 1,225,730 | Gargiulo | May 8, 1917 |
| 1,565,063 | Cotton | Dec. 8, 1925 |
| 1,657,695 | Richardson | Jan. 31, 1928 |
| 2,074,966 | Little | Mar. 23, 1937 |

FOREIGN PATENTS

| Number | Country | Date |
|---|---|---|
| 55,042 | Germany | Feb. 4, 1891 |
| 450,590 | Great Britain | July 20, 1936 |
| 458,947 | Germany | Apr. 23, 1928 |
| 86,716 | Sweden | June 30, 1936 |